UNITED STATES PATENT OFFICE.

WILLIAM J. HILLIS, OF JOHNSTOWN, PENNSYLVANIA, ASSIGNOR TO HILLIS-SIMLER BRICK COMPANY, OF JOHNSTOWN, PENNSYLVANIA.

FURNACE-BRICK.

1,168,211.      Specification of Letters Patent.      Patented Jan. 11, 1916.

No Drawing.      Application filed November 2, 1914. Serial No. 869,953.

*To all whom it may concern:*

Be it known that I, WILLIAM J. HILLIS, a citizen of the United States, residing at Johnstown, in the county of Cambria and State of Pennsylvania, have invented certain new and useful Improvements in Furnace-Brick, of which the following is a specification.

My invention relates to the composition of matter for making bricks, and more especially bricks adapted to be used in places where they will be exposed to extreme heat.

My object is to provide a brick particularly adapted for lining furnaces and the like where the lining is exposed to exceedingly great heat, such, for instance as open hearth steel furnaces, etc.

Another object is to provide a brick of this character which while having great heat resisting qualities, will also be free from contraction and expansion, and will consequently be very durable.

In making a brick possessing the qualities just referred to, I employ the following ingredients, in approximately the proportions mentioned below namely:—ground flint 20%, plastic clay 10%, carborundum 30%, binding clay 40%. However, I allow myself reasonable latitude in the proportionate amounts of the above ingredients, since it is often the case that some of the ingredients are somewhat different in different localities, or when produced or prepared under slightly varying conditions. In all such cases I make such changes as good judgment may dictate. Again, there may be instances in which it is specially desirable to accentuate some one of the qualities mentioned above, which accentuation would require a modification of the proportions of the formula.

The "plastic clay" herein referred to, is simply a good quality of ordinary clay such as is usually employed in the making of building brick or fire brick. The "binding clay" referred to, is a different clay entirely. It is a very hard, brittle clay, and is frequently called "hard flint clay." It has to be thoroughly ground before it can be used for making brick, and is very hard to work. It has a binding propensity which confers upon it a very superior quality as a clay for making bricks that are to be exposed to excessive heat, as in blast furnaces, hot stoves, etc. This clay is only found in certain sections of the country, not being as common as the ordinary good brick clay above referred to; however, the grades of it are as numerous.

Bricks made of the materials above referred to are particularly well adapted for open hearth steel furnace linings, or for any other lining where the same is exposed to intense heat.

It is found by practical experiment that this brick is free from expansion and contraction, and in this very important respect it is, so far as we know, unlike any other brick manufactured.

In a furnace lined with ordinary brick such as is commonly used for that purpose, the expansion and contraction of the lining which takes place, serves to crack and disintegrate the lining, and in that way greatly shortens its life and impairs its utility, however great may be the fire resisting qualities of the brick used; and however excellent the brick might be for all purposes where there was an even and continuous heat employed.

Steel companies have made strenuous efforts, and spent large sums of money endeavoring to produce a brick that will be free from the expansion and contraction now found in the bricks used for the lining of blast furnaces, open hearth furnaces, hot stoves, etc., where great and comparatively sudden changes of temperature must often take place. The brick herein referred to overcomes this very objectionable feature, and has lasting qualities far beyond that of any other brick of which I have any knowledge; and for this and the other reasons herein enumerated, has, after extensive and thorough tests, met with very great favor.

Having thus set forth the ingredients of which my brick is formed, and the qualities of the brick which I obtain therefrom, what I claim is:—

A brick formed of ground flint, plastic clay, carborundum, and binding clay in about the following proportions:—ground flint 20%, plastic clay 10%, carborundum 30%, binding clay 40%.

In testimony whereof I affix my signature in presence of two witnesses.

WILLIAM J. HILLIS.

Witnesses:
 ELLA L. MOSER,
 M. J. BAUMGARDNER.